(No Model.)
T. HIPWELL.
LAMP STOVE.
No. 506,432. Patented Oct. 10, 1893.
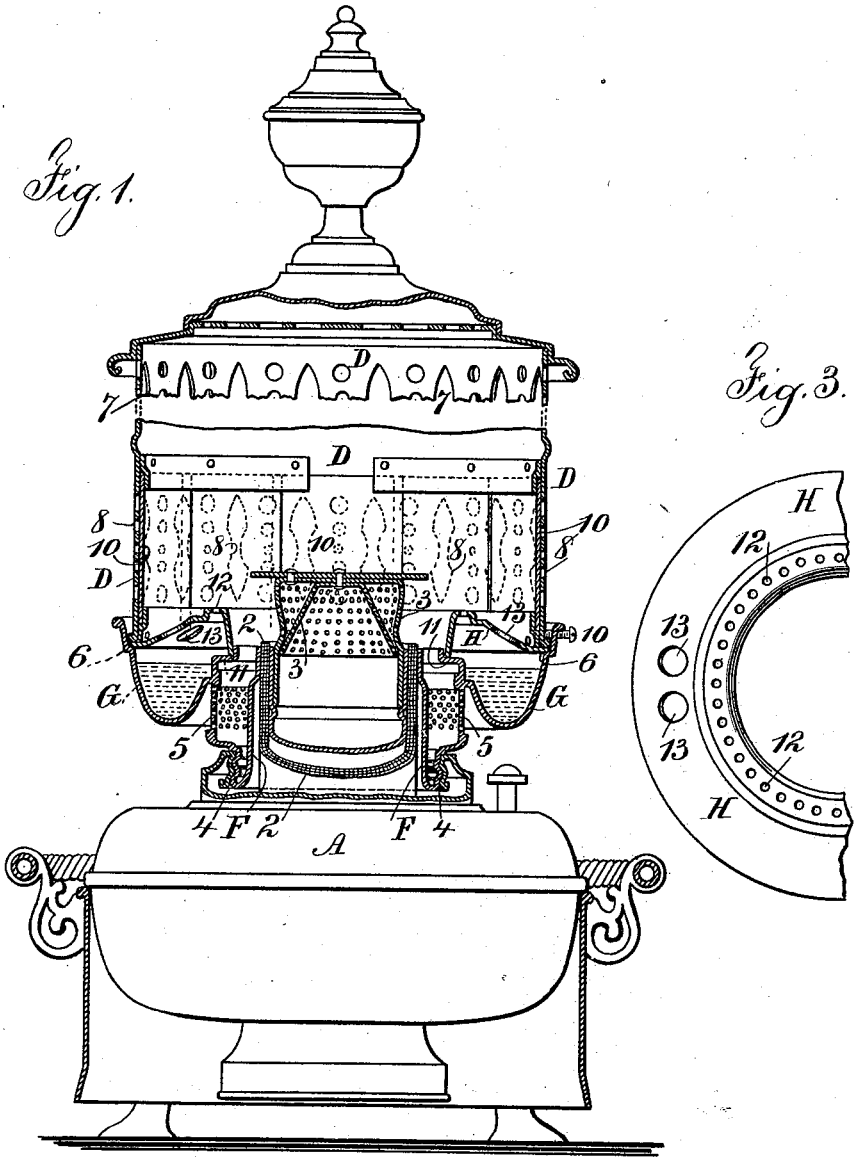
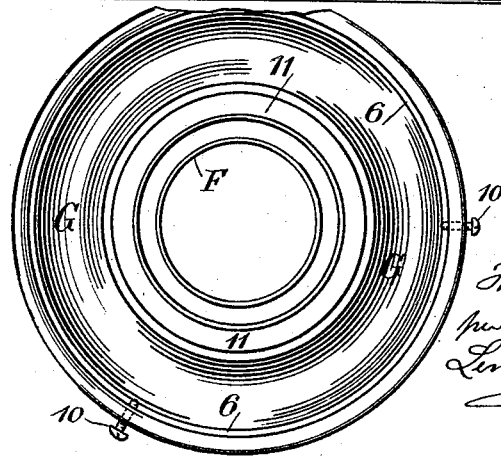
Witnesses
Chas H Smith
J. Staib
Inventor
Thomas Hipwell
per
Lemuel W. Serrell
Atty

UNITED STATES PATENT OFFICE.

THOMAS HIPWELL, OF LONG ISLAND CITY, ASSIGNOR TO THE MANHATTAN BRASS COMPANY, OF NEW YORK, N. Y.

LAMP-STOVE.

SPECIFICATION forming part of Letters Patent No. 506,432, dated October 10, 1893.

Application filed June 3, 1893. Serial No. 476,437. (No model.)

*To all whom it may concern:*

Be it known that I, THOMAS HIPWELL, a citizen of the United States, residing at Long Island City, in the county of Queens and State of New York, have invented an Improvement in Lamp-Stoves, of which the following is a specification.

Lamps and lamp stoves have heretofore been made in which water has been provided either around the wick tube or around the reservoir for the oil, the object being specially to extinguish the flame in case the lamp is upset, and in some instances the vapors passing up from the water which becomes heated pass into the flame and are consumed.

My present invention is especially adapted to that class of lamps which are used for heating purposes and in which there is a heating drum surrounding the flame and rising above the same and provided with openings in the heating drum with mica or similar material in the lower openings. In lamp stoves of this character it is generally desirable to prevent the heat radiating from the flame and drum down upon the floor or upon the reservoir containing the oil for the two-fold purpose of preventing the reservoir becoming heated and for insuring the dissemination of the heat throughout the apartment. With this object in view I make use of a water holding vessel around the flame and forming the base of the heating drum itself so as to intercept the rays of heat that might be radiated down upon the floor and to keep the base of the drum cool and at the same time the vapor which arises from the water in the vessel moistens the atmosphere of the room and also takes up any odors that otherwise might arise in the burning of the lamp.

In the drawings, Figure 1 is an elevation of the lamp with the base of the heating drum in section. Fig. 2 is a plan view of the water holding vessel detached, and Fig. 3 is a plan view of a portion of the cover of the water holding vessel.

The reservoir A is of any desired character and it is provided with a suitable base for supporting the same, and the Argand wick 2 and air distributer and deflector 3 are of any suitable character, and the heating drum D is usually of sheet metal having openwork in the upper part at 7 and in the lower part at 8, and there may be mica introduced within the drum at 10 for closing the lower openings and allowing for the transmission of light, as in my application, Serial No. 469,643, filed April 10, 1893, and patented July 11, 1893, No. 501,275.

The base of the wick tube F is removably connected with the reservoir A, preferably by a screw-thread at 4, and from this rises the air distributer 5 which is of suitable size and contains the perforations sufficient for admitting air to the outside of the flame, air also being admitted through the central tube of the Argand burner as usual, and connected with the upper end of the air distributer 5 is the water holding vessel G which is an annular trough having at its outer end a seat or holder 6 for the base of the heating drum D, there being screws 10 or a spring catch for confining a rim or a rib at the lower end of such heating drum D, and there is a deflector 11 extending from the inner edge of the annular water holding vessel G toward the base of the flame for directing the air upon the flame, and this water holding vessel G is to be of suitable size so as to contain the water necessary for the longest period of time during which the lamp is expected to burn, and there is a removable cover H over the water holding vessel, such cover resting at its outer edge at the base of the drum D, and its inner edge is adjacent to the deflector 11, and there are perforations at 12 through which vapor that may arise from the water passes closely adjacent to the flame so as to be consumed by the flame to whatever extent may be desired; and it is also advantageous to have finger holes 13 by which the annular cover H can be lifted from the water holding vessel to allow for the introduction of water.

By the present improvement the water holding vessel intervenes between the flame and the reservoir and it prevents the air distributer becoming highly heated by conduction and it also prevents heat being radiated from the flame to the reservoir or to the floor around the lamp stove, and the vapors thrown off by the water in consequence of the absorbed heat moisten the atmosphere of the apartment and render the same agreeable and also take up odors that might otherwise pass off with the products of combustion.

I claim as my invention—

1. The combination with the Argand burner, of a wick tube surrounding the wick and screwed into the upper end of the reservoir, an air distributer rising from the base of the wick tube, an annular water holding vessel supported at the upper end of the air distributer, and a heating drum resting at its lower end upon the annular water holding vessel, substantially as set forth.

2. The combination with the Argand burner and its air distributer, of a water holding vessel surrounding the upper part of the air distributer and supported thereby, a deflector at the base of the flame, a removable cover to the water holding vessel, and a heating drum with its base resting upon and supported by the water holding vessel, substantially as set forth.

3. The combination with the Argand wick-tube and burner, of an air distributer surrounding the wick tube, an annular water holding vessel around the flame and supported by the air distributer, and a cover for the water vessel having a circular range of perforations adjacent to the base of the flame, substantially as set forth.

Signed by me this 31st day of May, 1893.

THOMAS HIPWELL.

Witnesses:
JOHN J. WRENN,
W. H. BIRTWHISTLE.